Aug. 9, 1938.  H. FÖTTINGER  2,126,547
TURBOMECHANICAL TRANSMISSION GEAR
Filed April 29, 1936
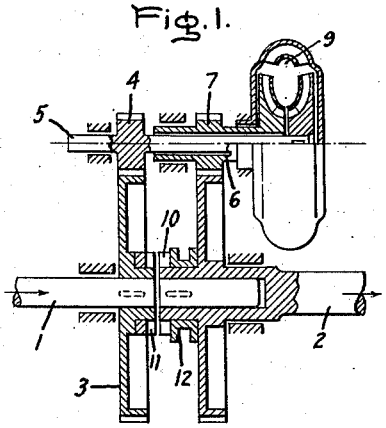
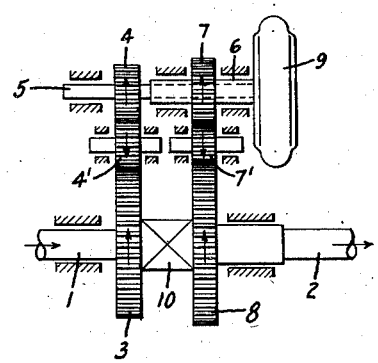
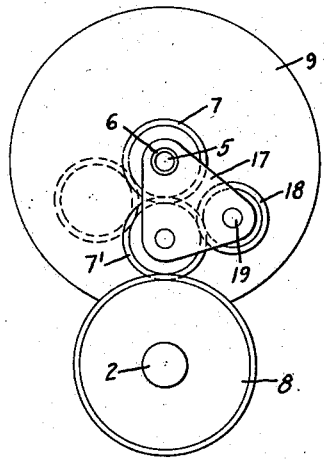
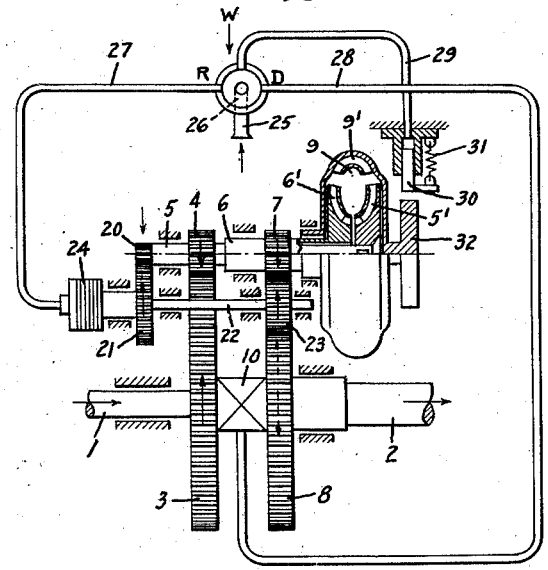
Inventor:
Hermann Föttinger,
by Harry E. Dunham
His Attorney.

Patented Aug. 9, 1938

2,126,547

UNITED STATES PATENT OFFICE 2,126,547

TURBOMECHANICAL TRANSMISSION GEAR

Hermann Föttinger, Berlin-Charlottenburg, Germany

Application April 29, 1936, Serial No. 76,962
In Germany May 2, 1935

9 Claims. (Cl. 74—189.5)

My invention relates to turbo-mechanical transmission gears, and more particularly to the type of transmission used to bring up to speed, gradually, a driven shaft so that it may be then direct coupled to a drive shaft.

It has been proposed to combine mechanical gears with turbo-gears in various ways, partly in order to interpose a step-up transmission between the driving shaft and the pump shaft of the turbo-gear, and partly in order to obtain from the turbine shaft of the turbo-gear to the driven shaft a sufficiently great and, in some cases, reversible step-down transmission.

In turbo-gears of this kind there arises the difficulty that the driving and the driven shafts are an inconvenient distance apart or are inconveniently placed with respect to one another, as a result of which the gear casing has a fissured and often a very weak shape, and this leads in turn to bad running and relatively rapid wear of the gear. Furthermore, in previous constructions there arises the disadvantage that with direct drive, that is on bridging-over of the turbo-gear, a considerable number of gear-wheels are under load, as a result of which unnecessary bearing loads and a series of different kinds of losses arise.

The invention aims to improve such turbo-mechanical gears, in which a mechanical step-up transmission gear is pre-connected and a mechanical step-down transmission gear is after-connected. This is attained according to the invention by arranging the main driving shaft and the main driven shaft coaxially and connecting them with one another by means of a releasable coupling.

The coaxial arrangement of the two mechanical transmission gears affords the advantage that a particularly easy incorporation of a direct coupling is possible. Furthermore, in this way, accuracy of production, as well as the assembly of the gear is facilitated. On direct drive all the gear-wheels and their bearings are completely relieved from loads so that they run idly without noise. At the same time the turbo-gear is automatically put out of action and thus its losses are cut-out. As a result of the inclusion of the mechanical portion of the gear, the construction of the casing for the gear-wheels as well as for the turbine portion may be considerably simplified. Furthermore, there results a substantial shortening of the whole gear. In addition, the accessibility, re-examination, dismantling and repair are considerably facilitated. Moreover, it may further be mentioned that, as a result of the invention, the drive for the auxiliaries, e. g. the return or control pumps, can be very conveniently arranged since the auxiliary shafts and the turbo-gear may assume any desired position around the main shafts. Besides these advantages there is finally the main advantage which is given by the pre-connection of a step-up transmission gear as first proposed by the applicant in reducing the size of the turbo-gear, accelerated filling and emptying and the like.

In the accompanying drawing, Fig. 1 is a cross-sectional view, partly diagrammatic, of a gear transmission built in accordance with my invention; Fig. 2 illustrates a modification of the mechanical gear of Fig. 1; Fig. 3 is an end view of a reversing mechanism incorporated in the mechanical gear of Fig. 2; and Fig. 4 is a diagrammatic illustration of a reversing system and apparatus applied to the arrangement shown in Fig. 1.

In each of the figures of the drawing, 1 denotes the main driving shaft, 2 the main driven shaft, 3 and 4 the pre-connected toothed-wheel step-up transmission, 5 the pump shaft, 6 the turbine shaft, 7 and 8 the after-connected toothed-wheel step-down transmission, 9 the turbine portion of the gear, and 10 the direct coupling.

The turbine portion 9 of the transmission comprises a hydraulic coupling of the type described in my U. S. Patents 1,199,359, and 1,199,360, issued September 29, 1916. The shaft 5, which is coupled to the drive shaft 1 through gears 3 and 4 drives a pump wheel 5' mounted in the casing of the device, thereby setting into motion the liquid which is in the casing, and causing this liquid to impinge upon the vanes of a turbine wheel 6' attached to the hollow shaft 6 after its direction of flow is changed by deflectors 9' mounted in the turbine casing and, in the present case, are held stationary. The shaft 6 being coupled to the driven shaft 2 through gears 7 and 8, the motion of the shaft 1 is transmitted to this driven shaft 2 with a loss in speed proportional to the load connected to the driven shaft. This loss, commonly referred to as slip, is at its maximum when the driving shaft begins to rotate and the driven shaft is still at rest, and gradually reduces to a minimum as the driven shaft is brought up to speed.

In the arrangement according to Fig. 1, which is a part-sectional elevation, the direct coupling 10 is a toothed coupling. The two halves 11 and 12 of the coupling are arranged directly against the associated gear-wheels 3 and 8. By displacing the half 12 of the coupling in any convenient manner, the teeth on the two halves are brought into or out of engagement. The main driving shaft 1 and the main driven shaft 2 can thus be directly connected with one another, the turbine portion being bridged over.

Should difficulties arise in some cases in accommodating the gear-wheels of the pre and after-connected transmission gears, it is preferred to provide intermediate wheels in the two gears so that the size of the gear-wheels can be reduced. Fig. 2 shows in elevation an example of such an arrangement, the two intermediate wheels being here denoted by 4' and 7'. In this arrangement, furthermore, the pre and after-connected toothed-wheel gears have unequal transmission ratios: It is in this way possible to compensate for the slip of the turbine portion 9 and thus to cause the shafts 1 and 2 to run at the same number of revolutions, which facilitates engagement of the direct coupling 10.

When intermediate wheels are employed in this way, the intermediate wheel 7' of the after-connected transmission gear may, according to the invention, be used at the same time for reversing. For this purpose the intermediate wheel 7' is arranged in a frame 17 which can swing about the shafts 6 as shown in Fig. 3. As a result of swinging of this frame, the intermediate wheel 7' can be swung out into the dotted position. At the same time a reversing gear-wheel 18, the shaft 19 of which is likewise fixed in the swinging frame 17, is brought into engagement with the main wheel 8 so that the latter now rotates in the reverse direction.

Another method of reversing is illustrated in Fig. 4. At the end of the pump shaft 5 there is provided a small gear-wheel 20 which engages with a large gear-wheel 21 of a reversing shaft 22. The gear-wheel 21 is connected with the reversing shaft 22 by a releasable coupling 24 which may, for example, be a multi-plate clutch. The right hand end of the shaft 22 carries a small gear-wheel 23 which engages directly with the main wheel 8 of the driven shaft 2. After engagement of the coupling 24, therefore, the main wheel 8 and the shaft 2 are driven in the reverse direction.

Fig. 4 further discloses a new method of reversal which can be employed with advantage in all cases in which only a slow reverse speed is necessary, as e. g. in the case of motor cars, tanks, or the like. The reversal of a gear having a turbine portion was hitherto effected by emptying the turbo-gear intended for forward drive. According to this invention, as disclosed in Fig. 4, the turbo-gear, in contradistinction to the earlier method, is kept filled and, as previously, drives the main driven shaft through the after-connected toothed-wheel transmission gear. The forward torque generated by the turbo-gear is not only overcome by the insertion of a special toothed wheel transmission gear, but is transformed into a reverse torque of any desired magnitude. In this way, special emptying and filling devices for the turbo may be dispensed with in the case of reverse drive just as in the case of the direct coupling.

If the turbine portion consists of a torque-increasing converter, i. e. a turbo-gear with a stationary guide device, it is preferred to put the guide device out of action at the same time as reversal is effected so as to deprive the converter of its torque-increasing action. The reverse drive to be engaged is then able to overcome all the easier the opposing moment of the filled turbo gear. The various couplings of the direct and reverse drive as well as the device for cutting-out the guide device of the turbo-gear are advantageously operated by means of a control which is connected or blocked in a suitable manner.

Fig. 4 shows an example of such a blocked control. Control by pressure medium is illustrated, the pressure medium, such as oil for example, being taken from any suitable source.

The pressure medium is supplied through a pipe 25 to a change-over cock 26 which may be situated, for example at the driver's position of a motor vehicle. The casing of this change-over cock is connected by means of a pipe 27 with the reverse drive coupling 24 by means of a pipe 28 with the direct coupling 10, and by means of a pipe 29 with a small piston 30. The piston 30, which is held in the upper position by a spring 31, co-operates, on changing-over of the cock 26 to the pipe 29, with a brake 32 by means of which the guide device 9' of the turbo-converter 9, which in this modification is rotatably mounted, can be held stationary. The change-over cock 26 may be brought into any one of three positions corresponding to the number of the pipes provided; these positions are indicated in the drawing by W (converter), D (direct drive), and R (reverse drive).

On starting, the change-over cock 26 is brought into position W, in which the supply pipe 25 of the pressure medium is brought into connection by way of the pipe 29 with the piston 30. The piston 30 is brought into engagement with the brake 32 against the action of its releasing spring 31 by the pressure medium so that the guide device 9' of the converter 9 is held stationary. The transmission of power from the shaft 1 to the shaft 2 then takes place by way of the torque-increasing torque converter 9. When the vehicle has reached its normal speed, the change-over cock 26 is moved around into the position D. The coupling 10 is now engaged and the guide device of the converter 9 simultaneously cut-out so that power is not transmitted directly from the shaft 1 to the shaft 2. If it is desired to travel backwards, the change-over cock 26 is moved around into the position R. In this position, the piston 30 for the actuation of the guide device as well as the direct coupling 10 are cut-out while the coupling 24 is cut-in. The transmission of power now takes place from the shaft 1 by way of gears 3, 4 to the shaft 5, from there by way of the reverse gear 20, 21, coupling 24, reverse shaft 22, and gear-wheel 23 to the main gear-wheel 8 of the driven shaft 2, which as a result of the insertion of the intermediate gear, now rotates in the reverse direction.

The invention may, with advantage, also be applied to the construction of really large couplings of a turbo-mechanical nature if it is a question of cutting-in and out without shock, while running, machines of very large output and revolutions.

For this purpose, for example, in the case of the construction according to Fig. 1, the turbo-gear 9 may be made as a turbo-coupling of high revolutions. Although I have shown only one turbo-coupling 9, it will be evident that several turbo-couplings with their pinions 4 and 7 may be arranged concentrically around the main gear-wheels 3 and 8. As a result of the uniform distribution of the peripheral forces which is produced with such an arrangement, the width of the toothed wheels, and therefore, their cost may be reduced considerably. A further reduction in cost is obtained by both described and the suggested combinations by the toothed wheels being loaded only during traveling with the turbo-coupling itself, while the main gear with direct couplings are on the contrary cut-out. Consequently, the gear-wheels need not be very accurately made and may therefore be produced substantially cheaper.

The large torsion oscillations of the main shafts which occur during cutting-in and out are completely damped exactly as in the case of direct cutting-in of the turbo-coupling between the shafts 1 and 2 for the subsequent parts of the transmission.

I declare that what I claim is:

1. In a high speed turbo-mechanical transmission gear, the combination of a driving shaft and a driven shaft arranged coaxially, a turbo-gear connected to said shafts through a step-up and step-down mechanical gear train respectively, and a direct coupling between the said shafts arranged to connect directly said shafts to each other.

2. In a turbo-mechanical transmission gear, the combination of a driving shaft and a driven shaft arranged coaxially, a turbo-gear connected to said shafts through a step-up and a step-down mechanical gear train respectively, and a mechanical coupling between said shafts arranged to connect directly said shafts to each other.

3. In a turbo-mechanical transmission gear, the combination of a driving and a driven shaft arranged coaxially, a turbo-gear connected to said shafts through a step-up and a step-down mechanical gear train, the transmission ratio of the gear train connected to the driven shaft being greater than that connected to the driving shaft, and a mechanical coupling arranged to directly connect said shafts.

4. In a turbo-mechanical transmission gear, the combination of a driving and a driven shaft arranged coaxially, a turbo-gear connected to said shafts through a step-up and a step-down mechanical gear train respectively, and a mechanical coupling arranged to directly connect said shafts, said coupling comprising cooperating elements mounted upon the gears mounted upon the said shafts respectively.

5. In a turbo-mechanical transmission, the combination of a driving and a driven shaft, and a direct coupling between said shafts manually operable to effect a direct coupling between said shafts when said shafts are at substantially the same speed, a transmission for bringing said driven shaft up to speed comprising a turbo-gear and a step-up and step-down mechanical gear train connected between said turbo-gear and said shafts respectively, and a reversing means arranged between said turbo-gear and said driven shaft comprising a pair of interengaging intermediate gears engaging one of said step-up gears, and means for moving one or both of said intermediate gears into said gear train to drive said driven shaft.

6. In a turbo-mechanical transmission, the combination of a driving and a driven shaft and a direct coupling between said shafts manually operable to effect a direct coupling between said shafts when said shafts are at substantially the same speed, a transmission for bringing said driven shaft up to speed comprising a turbo-gear and a step-up and step-down mechanical gear train connected between said turbo-gear and said shafts respectively, and a reversing means arranged between said turbo-gear and said driven shaft comprising a pair of interengaging intermediate gears engaging one of said step-down gears and mounted upon a frame pivoted on the shaft of said step-down gear, said frame being movable to connect one or both of said intermediate gears into said step-down gear train.

7. In a turbo-mechanical transmission, the combination of a driving and a driven shaft, a direct coupling between said shafts, a variable speed coupling between said shafts comprising a two element turbo drive connected to said shafts through step-up and step-down gears respectively, a reversing gear connected between said driven shaft and said turbo-gear, including a coupling device for connecting said driven shaft to the driving element of said turbo-gear and fluid pressure operated means for alternately making effective said direct coupling or said reversing coupling.

8. In a turbo-mechanical transmission, the combination of a driving and a driven shaft arranged coaxially, a turbo-gear comprising a pump element and a turbine element respectively coupled to said shafts by driving and driven gears for bringing said driven shaft up to speed, a mechanical coupling between said shafts manually operable to mechanically couple said shafts when they are at substantially the same speed, and reversing means comprising an intermediate gear engaging one of the said driven gears, and means for mechanically coupling said intermediate gear to said driving gear for reversing said driven shaft whereby the elements of said turbo gear are rotated in opposite directions to each other.

9. In a turbo-mechanical transmission, the combination of a driving and a driven shaft arranged coaxially, manually operable means for mechanically coupling said shafts when the said driven shaft has been brought up to speed, a turbo coupling connected to said shafts respectively, comprising a pump element, a turbine element and a rotatable deflector element, pressure operated means for maintaining stationary said rotatable deflector element during the bringing up to speed of said driven shaft, and means for reversing said driven shaft comprising a mechanical connection between said driving shaft and said driven shaft, and means for making said reversing connection effective simultaneously with the release of said brake means thereby releasing the rotatable deflector element.

HERMANN FÖTTINGER.